US006860532B1

(12) United States Patent
Potenzone

(10) Patent No.: US 6,860,532 B1
(45) Date of Patent: Mar. 1, 2005

(54) FLAGPOLE HALYARD REPLACEMENT AND TOOL THEREFOR

(76) Inventor: Thomas Potenzone, 39 Riverview Cir., Little Falls, NJ (US) 07424

( * ) Notice: Subject to any disclaimer, the term of this patent is extended or adjusted under 35 U.S.C. 154(b) by 141 days.

(21) Appl. No.: 10/268,520

(22) Filed: Oct. 10, 2002

(51) Int. Cl.[7] .................................................. B25J 1/00
(52) U.S. Cl. ........................................ 294/19.1; 294/24
(58) Field of Search ........................... 294/19.1, 22, 23, 294/24; 56/332, 339; 81/53.11, 53.12

(56) References Cited

U.S. PATENT DOCUMENTS

| | | | | | |
|---|---|---|---|---|---|
| 80,350 | A | | 7/1868 | Hoffman | |
| 366,141 | A | | 7/1887 | Vitalis | |
| 579,675 | A | * | 3/1897 | Glover | 294/24 |
| 609,013 | A | * | 8/1898 | Dowlen et al. | 294/22 |
| 1,024,968 | A | | 4/1912 | Beglinger | |
| 2,109,377 | A | * | 2/1938 | Airington | 294/19.1 |
| 2,312,521 | A | | 3/1943 | Bull | |
| 2,776,162 | A | * | 1/1957 | Bitz et al. | 294/23 |
| 2,783,076 | A | * | 2/1957 | Shropshire | 294/19.1 |
| 2,896,239 | A | * | 7/1959 | Copelin | 15/144.1 |
| 3,108,834 | A | | 10/1963 | Cassara | |
| 3,124,100 | A | | 3/1964 | Morley | |
| 3,300,185 | A | | 1/1967 | Metzger et al. | |
| 3,623,701 | A | | 11/1971 | Dudley | |
| 4,037,868 | A | | 7/1977 | Baker | |
| 4,063,768 | A | | 12/1977 | Denis | |
| 4,089,553 | A | * | 5/1978 | Frykholm | 294/19.1 |
| 4,153,286 | A | | 5/1979 | Piper et al. | |
| 4,719,826 | A | | 1/1988 | DuBois | |
| 5,494,326 | A | | 2/1996 | Hinds | |
| 5,769,474 | A | | 6/1998 | Moore | |
| 6,022,059 | A | * | 2/2000 | Regamey | 294/24 |
| 6,079,141 | A | | 6/2000 | Washecka | |
| 6,223,628 | B1 | | 5/2001 | Barron | |

* cited by examiner

*Primary Examiner*—Dean J. Kramer
(74) *Attorney, Agent, or Firm*—Arthur Jacob

(57) ABSTRACT

A flagpole halyard is replaced with a method and a tool which enables an operator to reach up from the ground, detach a flagpole truck from the upper end of a flagpole and lower the truck to the ground for threading a replacement halyard through the truck. The truck then is replaced, from the ground, utilizing the method and tool. A cradle placed at the upper end of an elongate shaft is raised by the shaft to the truck for engaging and cradling the truck to lift the truck from the top of the flagpole, is lowered to gain access to the truck for threading of the replacement halyard, and is raised again to replace the truck, with the replacement halyard threaded therethrough, at the upper end of the flagpole.

19 Claims, 7 Drawing Sheets

FLAGPOLE HALYARD REPLACEMENT AND TOOL THEREFOR

The present invention relates generally to the installation and maintenance of flagpoles and pertains, more specifically, to the replacement of a severed flagpole halyard and a tool for facilitating such replacement.

The most common flagpoles in use currently include an elongate pole topped with a truck through which there is threaded a halyard used to suspend a flag on the pole, the halyard also serving to raise and lower the flag. The truck usually sits on the top end of the pole, with the pole fitted into a socket in the truck. From time to time the halyard must be replaced, requiring that a new halyard be threaded through the truck. If the halyard has been severed and has become unthreaded, it becomes necessary to reach the truck and thread a new halyard through the truck.

Current practices include: The use of a very long ladder to reach the truck (long ladders are notoriously unstable and the procedure is highly dangerous); The use of a "cherry-picker" type personnel lift (not readily available and very expensive when available); Engaging a person who merely climbs the flagpole to reach the truck (rarely available, and extremely dangerous if at all available); Dismounting the flagpole itself and lowering the flagpole to the ground to gain access to the truck (very expensive and time-consuming, usually requiring excavation and reinstallation). At one time, a device was proposed for reaching a pulley mounted at the top of a flagpole and rethreading the pulley with a halyard without detaching the pulley from the flagpole; however, the device had a complex and relatively expensive construction and, in use, required careful registration with the remote pulley, calling for a high degree of skill on the part of the operator in order to complete the replacement of a halyard.

The present invention avoids the time, expense, dangers and the necessity for a highly skilled operator, all as noted above in connection with current and proposed practices. A tool includes a cradle carried at one end of a long shaft. While standing on the ground, an operator can extend the shaft to raise the cradle and fit the cradle under the truck, and then lift the truck off the upper end of the flagpole. The shaft is then retracted to lower the truck to the ground. A new halyard then is threaded through the truck and the truck is placed back on the upper end of the flagpole, again using the cradle and shaft. The cradle is offset from the shaft so as to facilitate seating of the cradle beneath the truck and subsequent manipulation of the truck. Once in place on the flagpole, the truck is seated firmly on the flagpole merely by pulling down on the new halyard, thereby fully engaging the socket of the truck with the upper end of the flagpole. The entire operation is performed from the ground so that safety is maintained. In order to assist the operator in guiding the cradle up and down the flagpole, a guide is carried by the shaft of the tool and is extended around the flagpole. The guide slides along the flagpole, spaced a short distance below the cradle, so that the cradle is maintained in proximity with the flagpole and cannot wander away from a path leading directly to the upper end of the flagpole and to the truck.

Thus, the present invention attains several objects and advantages, some of which are summarized as follows: Provides a safe and expeditious procedure for replacing a flagpole halyard, utilizing a tool of relatively simple construction; facilitates replacement of a flagpole halyard with increased ease and with less time and expense; provides a flagpole halyard replacement tool which is highly portable, easy to use and inexpensive enough to find widespread adoption by a variety of operators, including even those of limited skills; enables increased safety over current practices in the replacement of a flagpole halyard; provides a flagpole halyard replacement tool having a relatively inexpensive yet rugged construction for widespread use and exemplary performance over an extended service life.

The above objects and advantages, as well as further objects and advantages, are attained by the present invention which may be described briefly as a flagpole halyard replacement tool for replacing a halyard supported by a truck located at a remote upper end of an installed flagpole having an upper end, a lower end and a circumference, the truck having an upper top, a lower bottom, and sides, the truck including a finial, a passage for receiving the halyard, and a coupling for attaching the truck to the flagpole, the tool comprising: an elongate shaft having a length extending along a longitudinal axis between an upper end and a lower end; and a cradle at the upper end of the shaft, the cradle being offset laterally from the shaft for engaging the bottom of the truck when the upper end of the shaft is raised to the truck, the cradle including first cradle elements extending generally laterally to engage the bottom of the truck and second cradle elements extending generally longitudinally to engage at least one of the sides of the truck, whereby the truck will be cradled for longitudinally upward movement to detach the truck from the upper end of the flagpole in response to upward extension of the shaft, for longitudinally downward movement to lower the detached truck and gain access to the passage in response to downward retraction of the shaft, for subsequent longitudinally upward movement to place the truck and halyard at the upper end of the flagpole, in response to subsequent upward extension of the shaft, and for subsequent longitudinally downward movement to engage the coupling with the upper end of the flagpole, in response to subsequent downward retraction of the shaft.

In addition, the present invention includes a flagpole halyard replacement tool for replacing a halyard supported by a truck located at a remote upper end of an installed flagpole having an upper end, a lower end and a circumference, the truck having an upper top, a lower bottom, and sides, the truck including a finial, a passage for receiving the halyard, and a coupling for attaching the truck to the flagpole, the tool comprising: an elongate shaft having a length extending along a longitudinal axis between an upper end and a lower end; a cradle at the upper end of the shaft for engaging the bottom of the truck when the upper end of the shaft is raised to the truck, the cradle including cradle elements for cradling the truck for longitudinally upward movement to detach the truck from the upper end of the flagpole in response to upward extension of the shaft, for longitudinally downward movement to lower the detached truck and gain access to the passage in response to downward retraction of the shaft, for subsequent longitudinally upward movement to place the truck and halyard at the upper end of the flagpole, in response to subsequent upward extension of the shaft, and for subsequent longitudinally downward movement to engage the coupling with the upper end of the flagpole, in response to subsequent downward retraction of the shaft; and a guide on the shaft, the guide being located beneath and adjacent the cradle for guiding the cradle along a path extending adjacent the flagpole, between the upper end and lower end of the flagpole, such that as the shaft is extended along the path, the shaft is stabilized and the cradle is guided toward the truck.

Further, the present invention includes a method for replacing a halyard supported by a truck located at a remote upper end of an installed flagpole having an upper end, a lower end and a circumference, the truck having an upper top, a lower bottom, and sides, the truck including a finial, a passage for receiving the halyard, and a coupling for attaching the truck to the flagpole, the method comprising: providing an elongate shaft having a length extending along a longitudinal axis between an upper end and a lower end and a cradle at the upper end of the shaft; raising the upper end of the shaft and engaging the cradle with the bottom of the truck when the upper end of the shaft is raised toward the truck; cradling the truck within the cradle for longitudinally upward and downward movement in response to upward and downward movement of the upper end of the shaft; detaching the truck from the upper end of the flagpole by upward movement of the upper end of the shaft; lowering the detached truck to gain access to the passage by downward movement of the upper end of the shaft; threading the halyard through the passage in the truck; subsequently moving the cradle with the truck therein longitudinally upwardly to place the truck and halyard at the upper end of the flagpole by subsequent upward movement of the upper end of the shaft; and subsequently roving the cradle with the truck therein longitudinally downwardly to engage the coupling with the upper end of the flagpole.

The invention will be understood more fully, while still further objects and advantages will become apparent, in the following detailed description of preferred embodiments of the invention illustrated in the accompanying drawing, in which.

Figure 1:
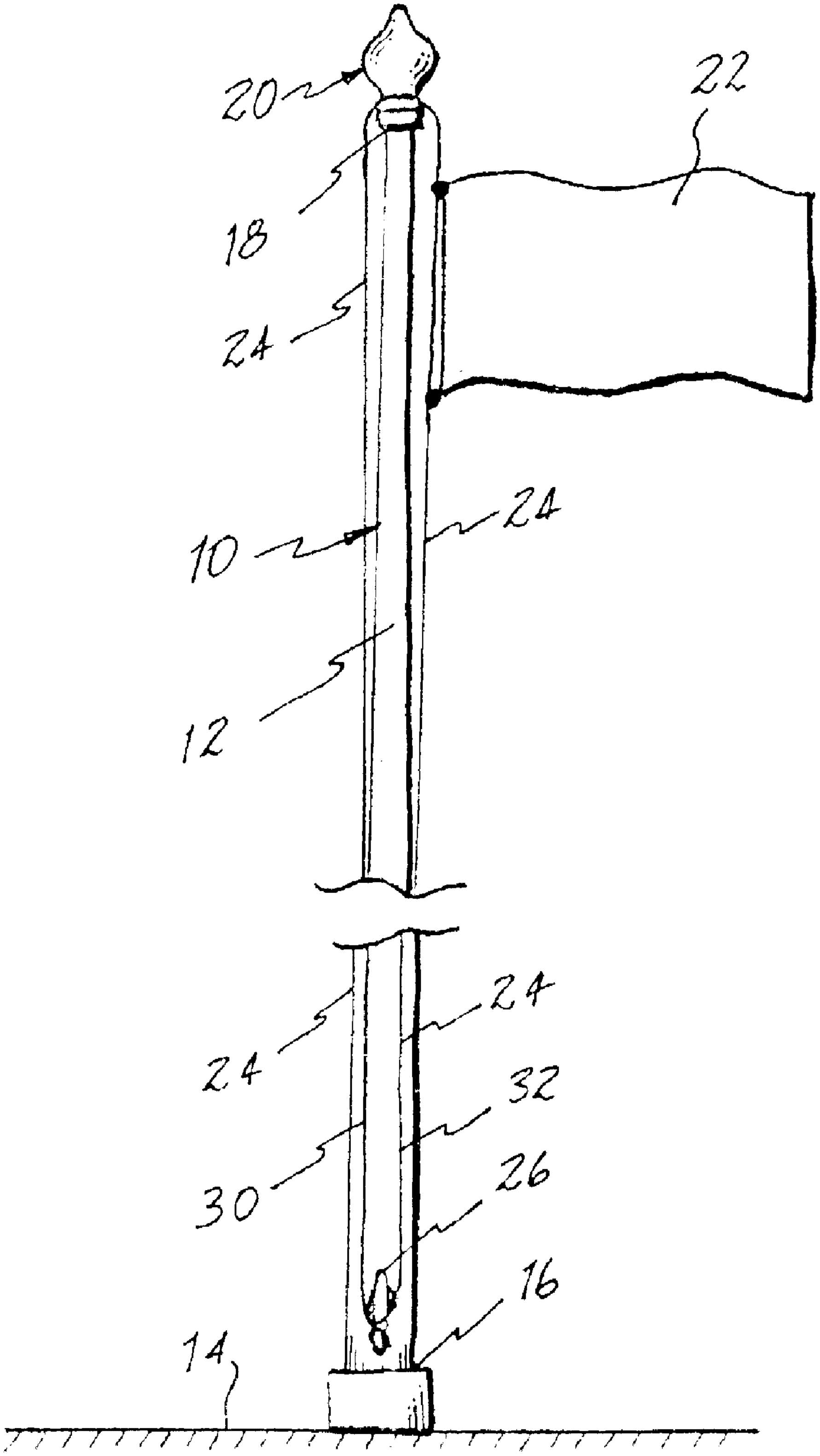
FIG. 1 is a somewhat diagrammatic elevational view showing a typical flagpole installation.

Referring now to the drawing, and especially to FIG. 1 thereof, a conventional flagpole installation is depicted and is seen to include a flagpole 10 having an elongate pole 12 anchored to the ground 14 at a lower end 16 and extending upwardly to a remote upper end 18, the pole 12 being tapered from a larger circumference at the lower end 16 to a smaller circumference at the upper end 18. A truck 20 is seated at the upper end 18 of the pole 12 and a flag 22 is suspended from the flagpole 10 by a halyard 24 which is threaded through the truck 20 and is secured to a cleat 26 located adjacent the lower end 16 of the pole 12. The flag 22 selectively is raised and lowered by releasing the halyard 24 from the cleat 26 and pulling on the halyard 24, at 30 to raise the flag 22 or at 32 to lower the flag 22.

Figure 2:
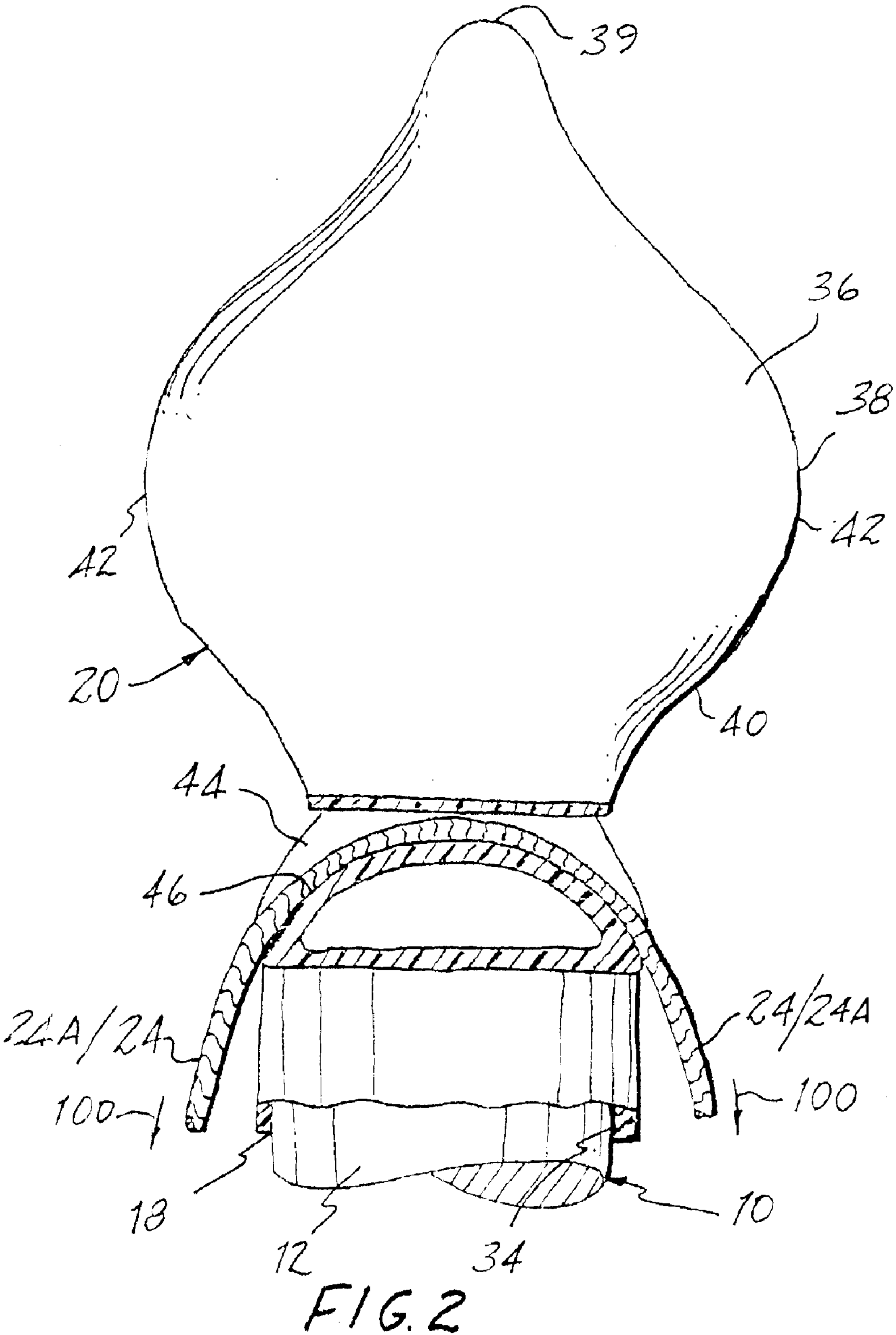
FIG. 2 is an enlarged fragmentary elevational view, partially sectioned, showing details of the flagpole truck of the installation.

As seen in FIG. 2, as well as in FIG. 1, truck 20 is seated and retained at the upper end 18 of the pole 12 by the engagement of a coupling, shown in the form of a socket 34, integral with truck 20, with the upper end 18 of the pole 12. Truck 20 includes a finial 36 having a decorative contour configuration 38 including an essentially pointed top 39, a flared bottom 40 and rounded sides 42 extending between the top 39 and bottom 40. Halyard 24 is threaded through truck 20 at 44, truck 20 including a grooved passage 46 for guiding and facilitating movement of the halyard 24 through the truck 20 as the flag 22 is raised and lowered. Routine replacement of halyard 24, as the halyard 24 becomes frayed, worn or otherwise unserviceable, is accomplished readily merely by attaching a new halyard to an old halyard and drawing the new halyard through the truck 20, with the truck 20 remaining in place at the upper end 18 of the pole 12. However, should halyard 24 become severed, as a result of neglect or through an unexpected, catastrophic failure, such as might occur under adverse weather conditions, halyard 24 can become unthreaded from truck 20 and replacement of the halyard will necessitate gaining access to truck 20 for rethreading a replacement halyard through the passage 46 of truck 20. The present invention provides a procedure and a tool for replacing the halyard.

Figure 3:
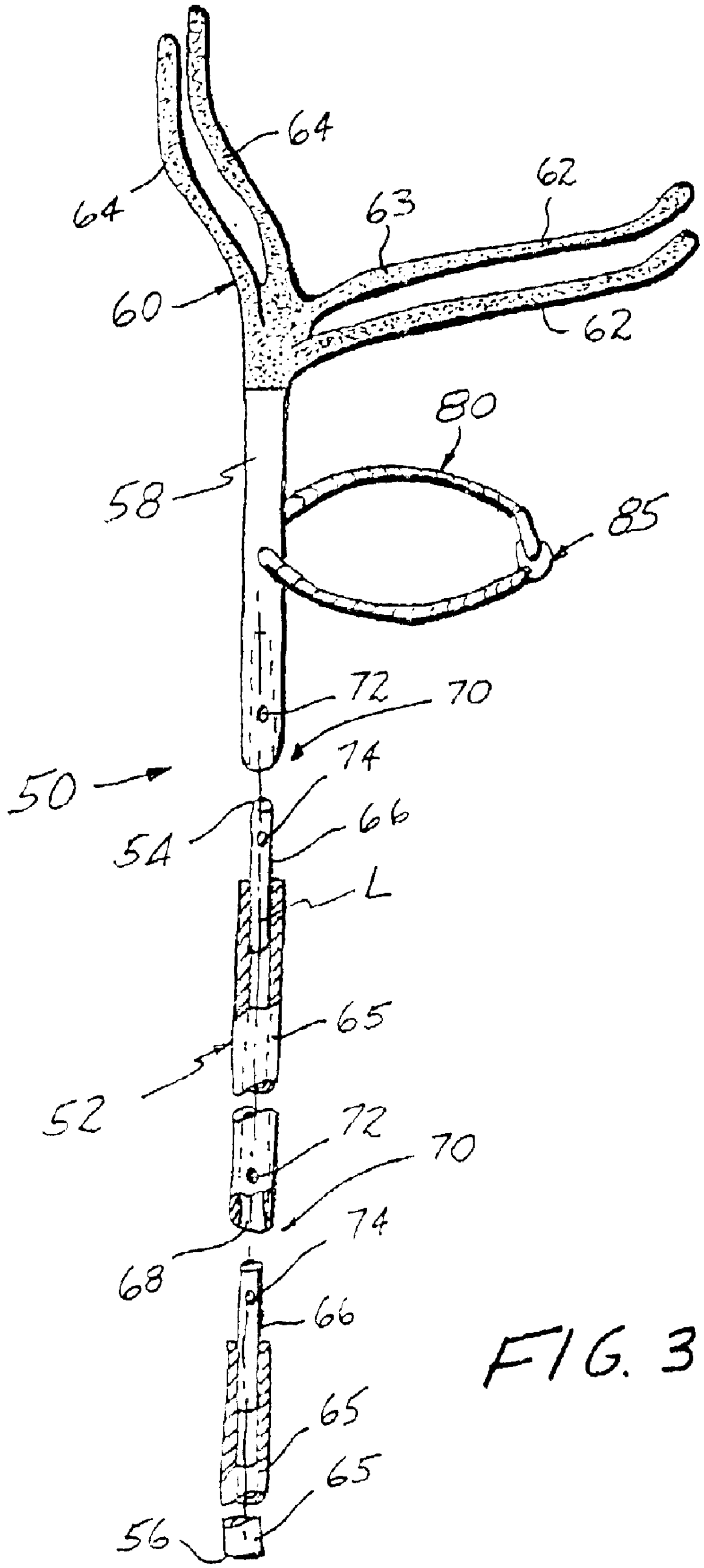
FIG. 3 is an exploded front elevational view of a flagpole halyard replacement tool constructed in accordance with the present invention.
Figure 4:
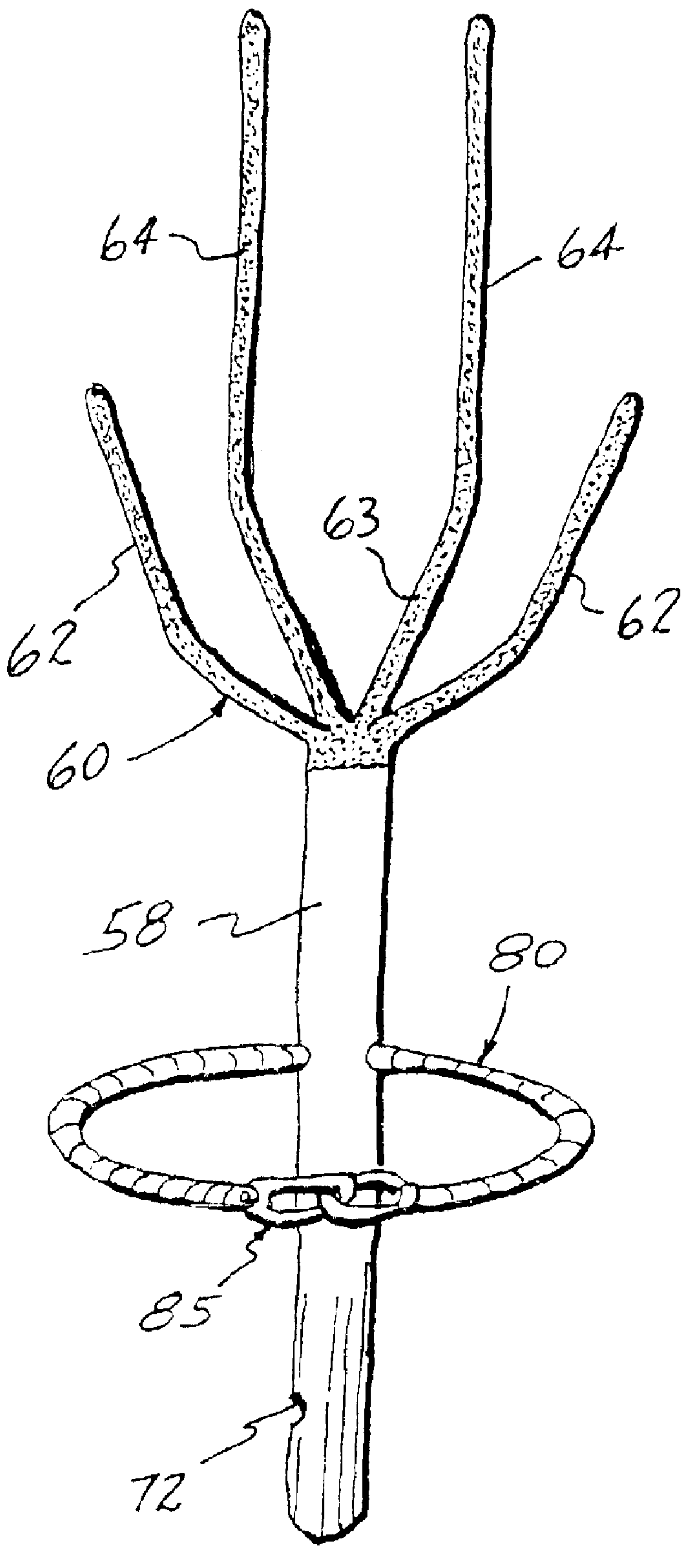
FIG. 4 is a fragmentary side elevational view of a portion of the tool.

Turning now to FIG. 3, a flagpole halyard replacement tool constructed in accordance with the present invention is shown at 50 and is seen to include an elongate shaft 52 extending along a longitudinal axis L between an upper end 54 and a lower end 56. A head 58 is located at the upper end 54 of the shaft 52 and includes a cradle 60 having multiple cradle elements in the form of prongs 62 extending generally laterally with respect to longitudinal axis L and prongs 64 extending generally longitudinally. As seen in FIG. 4, as well as in FIG. 3, prongs 62 are spaced apart from one another in a transverse direction, while prongs 64 likewise are spaced apart transversely from one another, for purposes to be described in detail below. Prongs 62 and 64 preferably are provided with an elastomeric coating 63 for purposes described below.

Shaft 52 preferably is comprised of sections 65 selectively connected to one another to selectively extend the shaft 52 incrementally to a desired length. Sections 65 are tubular and each section 65 includes a plug 66 at one end and a complementary receptacle 68 at the other end. Upon insertion of a plug 66 of one section 65 into a receptacle 68 of a consecutive section 65, a selectively releasable detent mechanism 70 secures the plug 66 within the engaged receptacle 68 to maintain the sections 65 assembled and provide shaft 52 with a length commensurate with the number of sections 65 in the assembly. Each detent mechanism 70 includes an aperture 72 communicating with a receptacle 68 and a projection 74 carried by each plug 66 for registration with a corresponding aperture 72 upon insertion of a plug 66 into a receptacle 68, the projection 74 being resiliently biased into the aperture 72 to secure consecutive sections 65 together in serial alignment.

Figure 5:
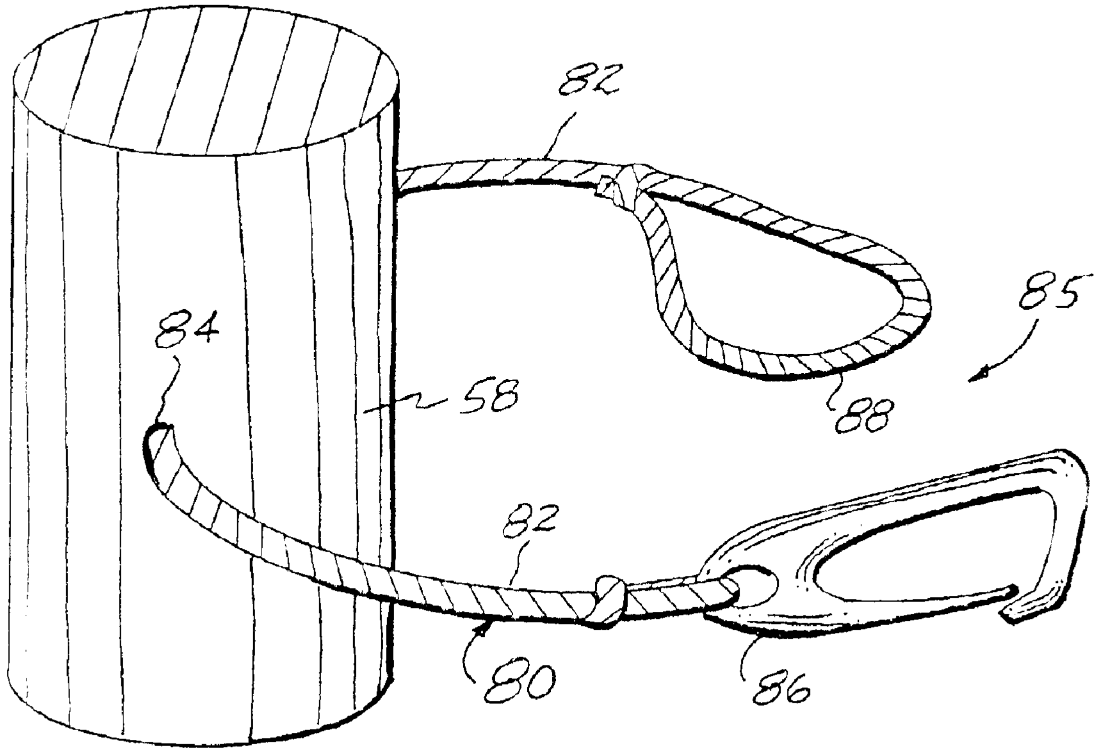
FIG. 5 is an enlarged fragmentary pictorial view showing a component part of the tool.

As seen in FIG. 5, as well as in FIGS. 3 and 4, a guide 80 is placed on the shaft 52 below the cradle 60 and is located a short distance longitudinally below the cradle 60, for purposes to be described below. Guide 80 includes guide elements in the form of flexible strap segments 32 attached to the head 58 at 84 and extending laterally to a selectively fastened and unfastened fastener 85 having fastener elements in the form of a spring snap 86 and a loop 88.

Figure 6:
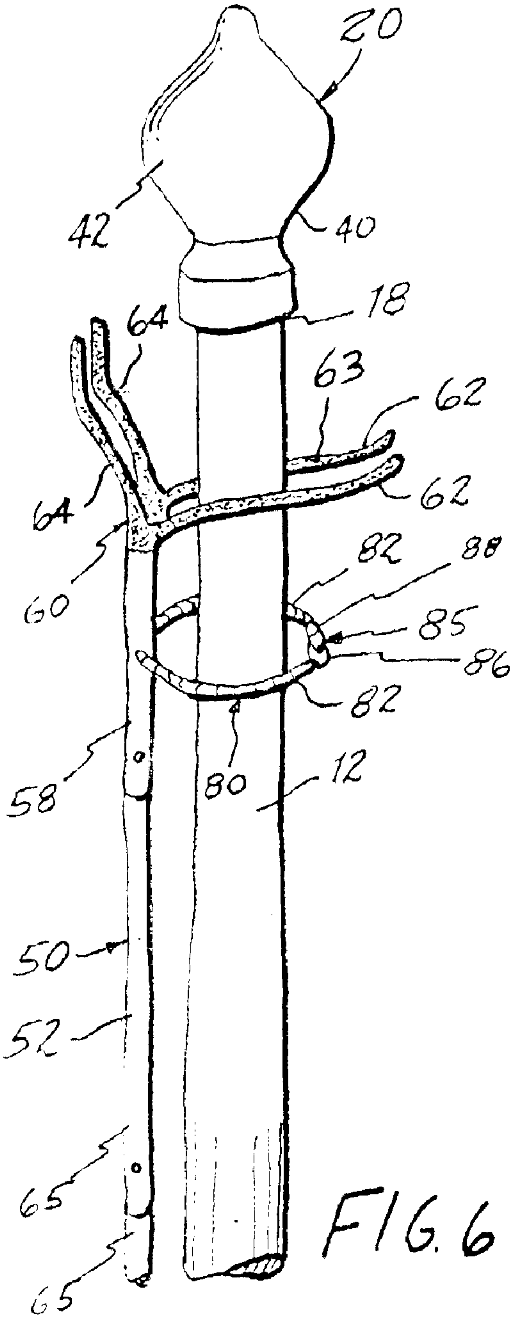
FIG. 6 is a pictorial view showing the tool in a position of operation.
Figure 7:
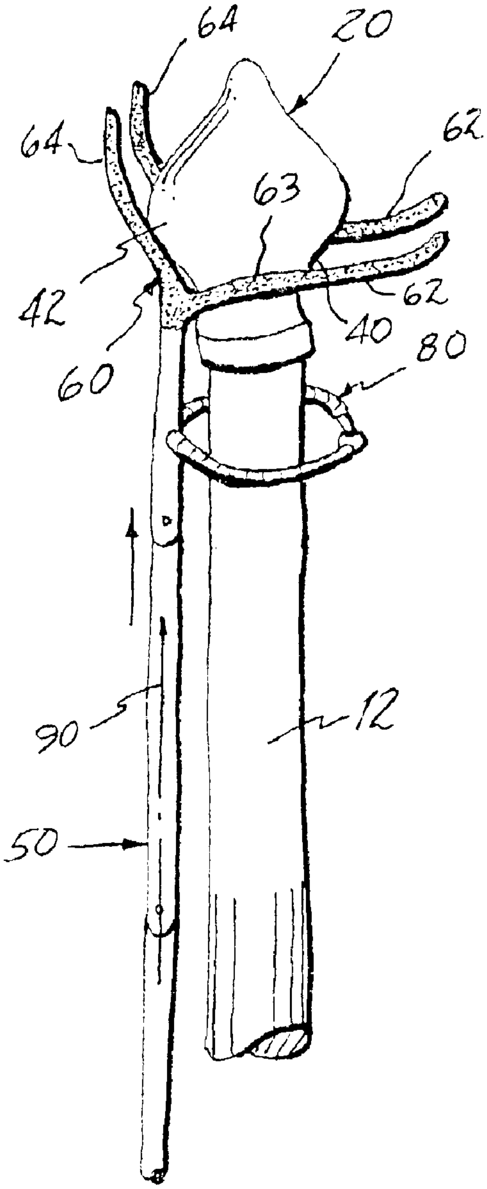
FIG. 7 is a pictorial view similar to FIG. 6 and showing the tool in another position of operation.
Figure 8:
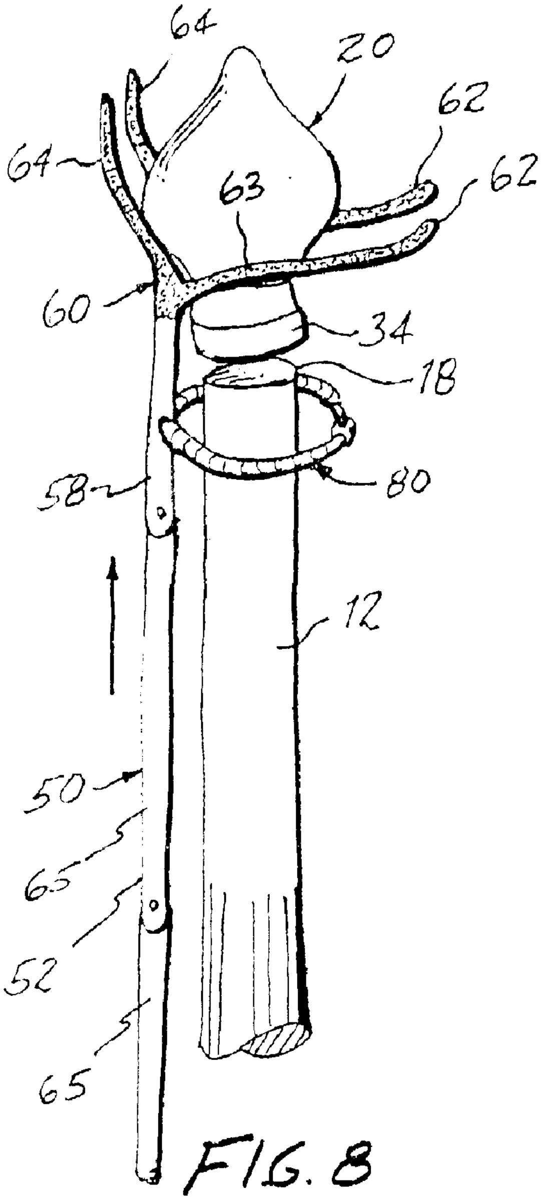
FIG. 8 is a pictorial view similar to FIG. 6 and showing the tool in still another position of operation.

Referring now to FIGS. 6 through 9, as well as to FIGS. 1 and 2, when it becomes necessary to thread a new halyard through truck 20, tool 50 is utilized by an operator (not shown) to gain access to truck 20 by removing truck 20 from the upper end 18 of pole 12. To this end, shaft 52 of tool 50 is juxtaposed with pole 12, nearer the lower end 16 of pole 12 and, with the prongs 62 of cradle 60 confronting the pole 12, the strap segments 82 of guide 80 are extended around the circumference of pole 12 and joined by engaging spring snap 86 with loop 88 of fastener 85, as seen in FIG. 6. The shaft 52 is then extended to raise the cradle 60, guided, maintained and stabilized along a path 90 juxtaposed with the pole 12 and leading up to the truck 20. In the illustrated preferred construction, shaft 52 is extended by serially connecting consecutive sections 65 as the cradle 60 is raised toward the truck 20. As the shaft 52 is elongated, the guide 80 assures that the cradle 60 does not wander from the path 90. The prongs 62 straddle the pole 12 and then engage the bottom 40 of the truck 20, as seen in FIG. 7. Further upward movement of the cradle 60 seats the cradle 60 against the truck 20 and raises the truck 20 to disconnect the socket 34 from the upper end 18 of the pole 12 and lift the truck 20 from the pole 12, as shown in FIG. 8. The cradle 60 is offset laterally toward the pole 12 and truck 20 so that the upward movement of the shaft 52 is facilitated and truck 20 is lifted directly off the pole 12. The prongs 62 and 64 are located and shaped to essentially follow the contour configuration 38 of the truck 20 so that the location and shape of the prongs 62 and 64, coupled with the offset arrangement of the cradle 60, effectively cradles the truck 20, with prongs 62 confronting the bottom 40 of the truck 20 and prongs 64 confronting sides 42 of the truck 20, to assure that the truck 20 remains stable within the cradle 60 during the ensuing steps of the procedure. The elastomeric coating 63 serves to cushion the truck 20 during movements of the cradle 60, thereby enhancing the retention of truck 20 in the cradle 60 while protecting the truck 20 against damage from abrasion and the like. Further, by choosing a contrasting color for coating 63, visibility is enhanced for facilitating appropriate positioning of the cradle 60 beneath the truck 20.

Figure 9:
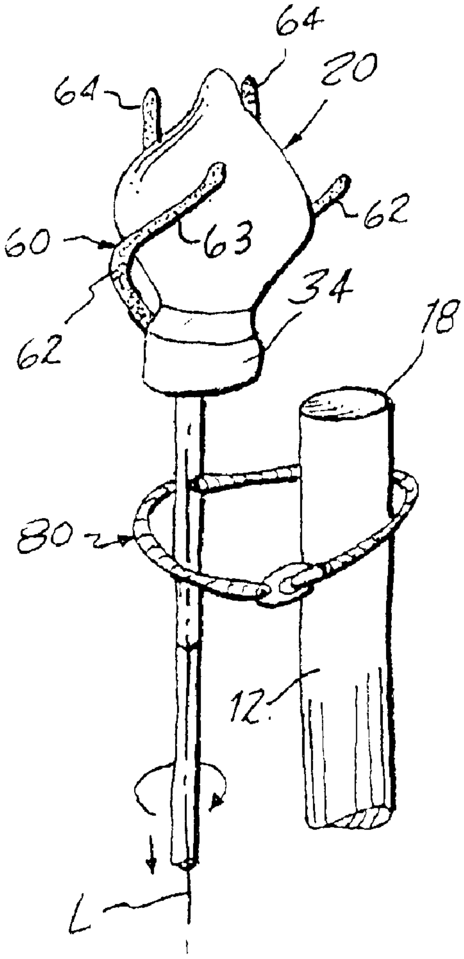
FIG. 9 is a pictorial view similar to FIG. 6 and showing the tool in yet another position of operation.

As seen in FIG. 9, the shaft 52 is then turned about the longitudinal axis L to selectively move the cradle 60, and the truck 20 secured therein, laterally so as to clear the pole 12 as the truck 20 is lowered toward the ground 14. The relative dimensions of the guide 80 and the circumference of pole 12 are such that selective rotation of the shaft 52 displaces the cradle 60, and the truck 20 therein, a lateral distance sufficient to allow the truck 20 to remain undisturbed in the cradle 60 as the cradle 60 and the truck 20 are lowered. Lowering of the truck 20 is accomplished by retracting the shaft 52, the preferred retraction being by serially removing consecutive sections 65 of the shaft 52 to contract the length of the shaft 52 until the truck 20 is lowered to an elevation where the operator on the ground 14 can gain access to the truck 20. Once the truck 20 is in the hands of an operator on the ground 14, a new halyard 24A (see FIG. 2) is threaded into the passage 46 of the truck 20 and the truck 20 is returned to the upper end 18 of the pole 12 by reversing the above-described procedure. That is, once again the shaft 52 is extended, with the guide 80 engaged with the pole 12 to maintain direction and stability, as described above in connection with removal of the truck 20, and the truck 20 is placed at the upper end 18 of the pole 12. The shaft 52 then is retracted to lower the truck 20 onto the upper end 18 of the pole 12, with the pole 12 entering the socket 34 of the truck 20. In order to seat the truck 20 fully on the upper end 18 of the pole 12, the new halyard 24A is pulled downwardly, as illustrated by the arrows 100 in FIG. 2, to fully engage the socket 34 with the pole 12. The entire procedure is carried out with the operator remaining on the ground 14 so as to ensure the safety of the operator.

It will be seen that the present invention attains all of the objects and advantages summarized above, namely: Provides a safe and expeditious procedure for replacing a flagpole halyard, utilizing a tool of relatively simple construction; facilitates replacement of a flagpole halyard with increased ease and with less time and expense; provides a flagpole halyard replacement tool which is highly portable, easy to use and inexpensive enough to find widespread adoption by a variety of operators, including even those of limited skills; enables increased safety over current practices in the replacement of a flagpole halyard; provides a flagpole halyard replacement tool having a relatively inexpensive yet rugged construction for widespread use and exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A flagpole halyard replacement tool for replacing a halyard supported by a truck located at a remote upper end of an installed flagpole having an upper end, a lower end and a circumference, the truck having an upper top, a lower bottom, and sides, the truck including a finial, a passage for receiving the halyard, and a coupling for attaching the truck to the flagpole, the tool comprising:

an elongate shaft having a length extending along a longitudinal axis between an upper end and a lower end;

a cradle at the upper end of the shaft, the cradle being offset laterally from the shaft for engaging the bottom of the truck when the upper end of the shaft is raised to the truck, the cradle including first cradle elements extending generally laterally to engage the bottom of the truck and second cradle elements extending generally longitudinally to engage at least one of the sides of the truck, whereby the truck will be cradled for longitudinally upward movement to detach the truck from the upper end of the flagpole in response to upward extension of the shaft, for longitudinally downward movement to lower the detached truck and gain access to the passage in response to downward retraction of the shaft, for subsequent longitudinally upward movement to place the truck and halyard at the upper end of the flagpole, in response to subsequent upward extension of the shaft, and for subsequent longitudinally downward movement to engage the coupling with the upper end of the flagpole, in response to subsequent downward retraction of the shaft; and a guide on the shaft located beneath and adjacent the cradle for guiding the cradle along a path extending adjacent the flagpole, between the upper end and lower end of the flagpole, such that as the shaft is extended along the path, the shaft is stabilized and the cradle is guided toward the truck.

2. The flagpole halyard replacement tool of claim 1 wherein the shaft includes a selectively extensible structure for selectively extending and contracting the length of the shaft.

3. The flagpole halyard replacement tool of claim 2 wherein the extensible structure includes sections and connectors selectively connected to serially connect the sections for extending the length of the shaft upwardly to raise the cradle, and selectively disconnected for retracting the length of the shaft downwardly to lower the cradle.

4. The flagpole halyard replacement tool of claim 1 wherein the first cradle elements include at least two prongs extending laterally and spaced transversely from one another to straddle the flagpole and engage the bottom of the truck.

5. The flagpole halyard replacement tool of claim 4 wherein the second cradle elements include at least two prongs extending longitudinally and spaced transversely from one another to engage sides of the truck to complete a secure cradling of the truck within the cradle.

6. The flagpole halyard replacement tool of claim 1 wherein the guide includes guide elements for engaging the flagpole as the shaft is extended and retracted, and the cradle is concomitantly raised and lowered, the guide elements enabling selective displacement of the cradle laterally away from the flagpole a distance sufficient to allow the truck to remain undisturbed by the flagpole during raising and lowering of the cradle.

7. The flagpole halyard replacement tool of claim 6 therein the guide elements include strap segments and a selectively fastened and unfastened fastener for extending the strap segments around the circumference of the flagpole.

8. The flagpole halyard replacement tool of claim 6 wherein the relative dimensions of the guide elements and the circumference of the flagpole adjacent the top end of the flagpole enables the selective displacement of the cradle by rotating the shaft about the longitudinal axis thereof.

9. The flagpole halyard replacement tool of claim 8 wherein the guide elements include strap segments and a selectively fastened and unfastened fastener for extending the strap segments around the circumference of the flagpole.

10. A flagpole halyard replacement tool for replacing a halyard supported by a truck located at a remote upper end of an installed flagpole having an upper end, a lower end and a circumference, the truck having an upper top, a lower bottom, and sides, the truck including a finial, a passage for receiving the halyard, and a coupling for attaching the truck to the flagpole, the tool comprising:

an elongate shaft having a length extending along a longitudinal axis between an upper end and a lower end;

a cradle at the upper end of the shaft for engaging the bottom of the truck when the upper end of the shaft is raised to the truck, the cradle including cradle elements for cradling the truck for longitudinally upward movement to detach the truck from the upper end or the flagpole in response to upward extension of the shaft, for longitudinally downward movement to lower the detached truck and gain access to the passage in response to downward retraction of the shaft, for subsequent longitudinally upward movement to place the truck and halyard at the upper end of the flagpole, in response to subsequent upward extension of the shaft, and for subsequent longitudinally downward movement to engage the coupling with the upper end of the flagpole, in response to subsequent downward retraction of the shaft; and a guide on the shaft, the guide being located beneath and adjacent the cradle for guiding the cradle along a path extending adjacent the flagpole, between the upper end and lower end of the flagpole, such that as the shaft is extended along the path, the shaft is stabilized and the cradle is guided toward the truck.

11. The flagpole halyard replacement tool of claim 10 wherein the guide includes guide elements for engaging the flagpole as the shaft is extended and retracted, and the cradle is concomitantly raised and lowered, the guide elements enabling selective displacement of the cradle laterally away from the flagpole a distance sufficient to allow the truck to remain undisturbed by the flagpole during raising and lowering of the cradle.

12. The flagpole halyard replacement tool of claim 11 wherein the guide elements include strap segments and a selectively fastened and unfastened fastener for extending the strap segments around the circumference of the flagpole.

13. The flagpole halyard replacement tool of claim 11 wherein the relative dimensions of the guide elements and the circumference of the flagpole adjacent the top end of the flagpole enables the selective displacement of the cradle by rotating the shaft about the longitudinal axis thereof.

14. The flagpole halyard, replacement tool of claim 13 wherein the guide elements include strap segments and a selectively fastened and unfastened fastener for extending the strap segments around the circumference of the flagpole.

15. A method for replacing a halyard supported by a truck located at a remote upper end of an installed flagpole having an upper end, a lower end and a circumference, the truck having an upper top, a lower bottom, and sides, the truck including a finial, a passage for receiving the halyard, and a coupling for attaching the truck to the flagpole, the method comprising:

providing an elongate shaft having a length extending along a longitudinal axis between an upper end and a lower end and a cradle at the upper end of the shaft;

raising the upper end of the shaft and engaging the cradle with the bottom of the truck when the upper end of the shaft is raised toward the truck;

cradling the truck within the cradle for longitudinally upward and downward movement in response to upward and downward movement of the upper end of the shaft;

detaching the truck from the upper end of the flagpole by upward movement of the upper end of the shaft;

lowering the detached truck to gain access to the passage by downward movement of the upper end of the shaft;

threading the halyard through the passage in the truck;

subsequently moving the cradle with the truck therein longitudinally upwardly to place the truck and halyard at the upper end of the flagpole by subsequent upward movement of the upper end of the shaft; and subsequently moving the cradle with the truck therein longitudinally downwardly to engage the coupling with the upper end of the flagpole.

16. The method of claim 15 including pulling on the halyard subsequent to engaging the coupling with the upper end of the flagpole to further secure the truck on the flagpole.

17. The method of claim 15 wherein the raising of the upper end of the shaft includes extending the length of the shaft.

18. The method of claim 17 wherein the lowering of the upper end of the shaft includes contracting the length of the shaft.

19. The method of claim 15 including providing a guide adjacent the upper end of the flagpole, and engaging the guide with the flagpole during movement of the upper end of the shaft to guide the upper end along a path adjacent the flagpole to the truck.

* * * * *